(No Model.)
E. P. LYNCH.
WALKING CULTIVATOR.
No. 384,048. Patented June 5, 1888.
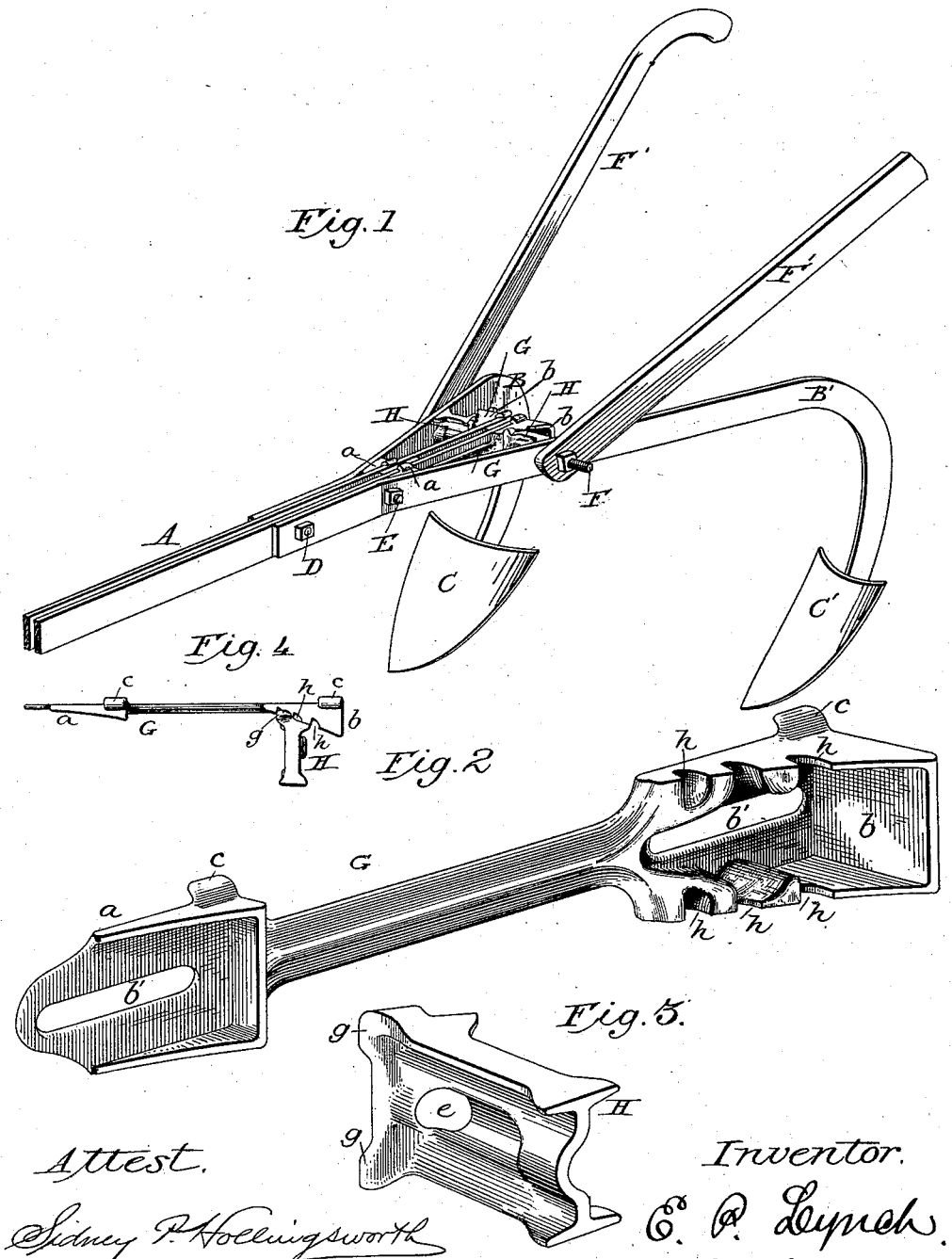

UNITED STATES PATENT OFFICE.

EDWARD P. LYNCH, OF DAVENPORT, IOWA.

WALKING-CULTIVATOR.

SPECIFICATION forming part of Letters Patent No. 384,048, dated June 5, 1888.

Application filed June 12, 1886. Serial No. 204,983. (No model.)

*To all whom it may concern:*

Be it known that I, EDWARD P. LYNCH, of Davenport, in the county of Scott and State of Iowa, have invented certain Improvements in Walking-Cultivators, of which the following is a specification.

My invention relates to what are commonly known as "double-shovel plows," in which two diverging shovel-carrying beams are connected at their forward ends to a central beam by devices which admit of their being adjusted laterally, in order to spread them more or less, and thus vary the distance between the paths of their shovels.

The invention has reference to means for conveniently effecting the lateral adjustment of the beams and for securing them in their desired position.

To this end it consists in longitudinally-adjustable wedges of peculiar construction, and in the combination therewith of peculiar bearing-plates, in the manner hereinafter specified.

Referring to the accompanying drawings, Figure 1 represents a perspective view of a plow provided with my improvement. Fig. 2 represents one of the double wedges in its preferred form. Fig. 3 represents the block or plate used in connection with the wedge. Fig. 4 is a plan view illustrating the peculiar form of the wedge.

Referring to the drawings, A represents the central beam to which the draft is applied; B and B', the two curved metallic beams provided with shovels C C', and connected at their forward ends to opposite sides of the main beam by transverse bolts D and E, or equivalent fastenings. F' represents the two handles by which the implement is guided, their lower ends being secured to the outer sides of the beams B and B' by means of a single bolt, F, which passes through the handles and the beams, as shown.

The foregoing parts are or may be of ordinary construction and arrangement.

In applying my improvement I provide for each side of the plow a plate, G, of the form shown in Fig. 2, adapted for insertion between the main beam and one of the shovel-beams for the purpose of spreading or holding them apart. This wedge is preferably made, as shown, with two inclined or tapered portions, *a* and *b*, at opposite ends, the forward and thin portion, *a*, adapted to fit into the narrow space between the forward portions of the beams, while the broader portion, *b*, lies between the rear portions of the beams, which are separated to a greater extent. I prefer to provide the plate with lips *c*, to engage over the edges of the main beam, and thus assist in holding it in place. I also provide the plate at its ends with longitudinal slots *b'*, through which the bolts E and F are passed, so that the accidental detachment of the plate is prevented. Between the rear end of each plate G and the adjacent shovel-beam I insert a plate or block, H, such as shown in Fig. 3. This block is provided, as shown, with the longitudinal opening *e*, through which the bolt F is passed to retain it in position. At its inner end the block is provided with teeth or projections *g*, adapted to interlock with corresponding notches, *h*, formed in the outer edge of the plate G, as shown in the drawings. Owing to this interlocking action of the parts they are prevented from slipping accidentally out of position. By loosening the bolts and driving the plate forward the beams D and E may be separated to the desired extent, and by then tightening the bolts the beams are locked firmly in position. The forward or thin end, *a*, of the plate G may be omitted and the portion *b* used alone in connection with the plate H; but it is preferred to employ the plate G with the two ends, for the reason that it affords better support for the beam. In place of a single bolt, F, passing through both the central and the side beams, I may employ on each side of the plow a short bolt passing only through the plates G and H, the central beam, and the shovel-standard on either side.

The rear end, *b*, of the wedge is commonly constructed with a pitch or inclination greater than that of the forward portion, *a*, and with a longitudinal curvature at its outer edge, as shown in Fig. 4, to compensate for the greater spread of the beams at the rear as compared with the front.

Having thus described my invention, what I claim is—

1. In combination with the main beam and the shovel-beam applied to its side, the intermediate plate, G, provided at opposite ends with the two distinct wedges.

2. In combination with the main beam and the shovel-beam applied to its side, the intermediate adjustable plate, G, having two wedge-like portions at opposite ends, and the plate H, seated between the rear end of the plate G and the shovel-beam, whereby the shovel-beam is supported at two points and its adjustment at both points simultaneously permitted.

3. The main beam and the shovel-beam at its side, and the intermediate wedge-like block, $b$, having its outer face curved longitudinally and provided with notches $h$, in combination with the block H, constructed and arranged to interlock therewith, as described.

In testimony whereof I hereunto set my hand this 14th day of May, 1886, in the presence of two attesting witnesses.

EDWARD P. LYNCH.

Witnesses:
GEO. H. FRENCH,
G. WATSON FRENCH.